US012703450B2

(12) United States Patent
Soatti et al.

(10) Patent No.: US 12,703,450 B2
(45) Date of Patent: Aug. 11, 2026

(54) SADDLE RIDING VEHICLE WITH AN ELONGATED TANK

(71) Applicant: PIAGGIO & C. S.P.A., Pontedera (IT)

(72) Inventors: Piero Soatti, Pontedera (IT); Damiano Bellan, Pontedera (IT); Alessandro Bonora, Pontedera (IT)

(73) Assignee: Piaggio & C.S.p.A., Pontedera (IT)

( * ) Notice: Subject to any disclaimer, the term of this patent is extended or adjusted under 35 U.S.C. 154(b) by 857 days.

(21) Appl. No.: 17/912,644

(22) PCT Filed: Mar. 15, 2021

(86) PCT No.: PCT/IB2021/052129
§ 371 (c)(1),
(2) Date: Sep. 19, 2022

(87) PCT Pub. No.: WO2021/186323
PCT Pub. Date: Sep. 23, 2021

(65) Prior Publication Data

US 2023/0139934 A1 May 4, 2023

(30) Foreign Application Priority Data

Mar. 19, 2020 (IT) ........................ 102020000005863

(51) Int. Cl.
*B62K 25/30* (2006.01)
*B62J 35/00* (2006.01)
(Continued)

(52) U.S. Cl.
CPC ............... *B62J 35/00* (2013.01); *B62K 11/04* (2013.01); *B62K 19/32* (2013.01); *B62K 25/04* (2013.01)

(58) Field of Classification Search
CPC ........ B62K 11/04; B62K 19/32; B62K 25/04; B62J 35/00; F28F 9/00; B60K 15/03
(Continued)

(56) References Cited

U.S. PATENT DOCUMENTS 4,469,190 A 9/1984 Yamaguchi
4,951,774 A 8/1990 Buell
(Continued)

FOREIGN PATENT DOCUMENTS

JP H03109188 A 5/1991
JP 2017065568 A * 4/2017 .............. B62J 35/00

OTHER PUBLICATIONS

International Searh Authority: European Patent Office International Search Report for PCT/IB2021/052129 dated Jun. 24, 2021, 7 pages.

*Primary Examiner* — Vivek D Koppikar
*Assistant Examiner* — Nabin Kumar Sharma
(74) *Attorney, Agent, or Firm* — Stetina Garred Brucker & Newboles

(57) ABSTRACT

The present invention relates to a saddle riding vehicle, preferably enduro. The vehicle comprises steering tube to which a steering assembly which controls a front wheel is rotatably connected. Saddle riding vehicle (1) comprises a motor assembly (2) and a frame to which said motor assembly (2) is connected; said vehicle (1) comprises a tank (7) supported by said frame. Such a tank comprises an upper section (71) in a position proximal to said steering tube (11), wherein said upper section (71) comprises two side portions (71A, 71B) spaced apart in the width direction and each of which extends in a position outside a corresponding frame front side. The tank also comprises a central section (72), communicating with the upper section (71), and which extends towards said rear wheel (4) according to the profile of said front part of said frame. The tank (7) further
(Continued)

comprises a lower section (73), communicating with said central section (72), which is comprised between the rear sides (18A, 18B) of the frame.

19 Claims, 11 Drawing Sheets

(51) Int. Cl.

| | |
|---|---|
| ***B62K 3/02*** | (2006.01) |
| ***B62K 11/04*** | (2006.01) |
| ***B62K 19/32*** | (2006.01) |
| ***B62K 25/04*** | (2006.01) |

(58) Field of Classification Search

USPC .......................................................... 180/225

See application file for complete search history.

(56) References Cited

U.S. PATENT DOCUMENTS 5,145,023 A 9/1992 Tsurumi et al.
2004/0040958 A1* 3/2004 Hatakeyama ............ B62J 35/00 220/4.14
2005/0110265 A1* 5/2005 Miyakozawa ........... B62J 35/00 280/835
2012/0228857 A1* 9/2012 Karube .............. F02M 37/0076 280/835
2015/0068830 A1* 3/2015 Nakata ................... B60K 13/04 180/229

* cited by examiner

Y
402
400
4
8B
T2
73
A
78
78B
72
401
15
700
501
71
71A
111
11
161A
5
80
3
T1
8
88
12
8A
21B
21
22
10
2A
2
C
D
B

PV
4
8B
Y
8
18B
18A
X
750
72
32
15B
15A
700
71C
S
15C
74B
71B
74A
71A
715B
715A
5
5B
5A
1
3

P1
P2
11
12
12A
12B
15
15A
15B
15C
151A
152A
155A
155B
161A
161B
16A
16B
17A
17B
18
18A
18B
19
31
32
52A
53A
54A
81A
82A
83
811A
811B

SADDLE RIDING VEHICLE WITH AN ELONGATED TANK

The present invention relates to the field of manufacturing of a saddle riding motorcycle, preferably but not exclusively, of the desert type or, more generally, of an enduro type. In particular, the present invention relates to a saddle riding vehicle provided with a tank supported in the upper part of the frame and elongated towards the rear wheel of the vehicle, wherein a lower section of the tank is located substantially underneath the saddle of the vehicle.

PRIOR ART

Two-wheeled enduro vehicles comprise a frame which includes a steering tube to which a steering assembly is pivotally connected which controls a steering wheel, or front wheel. The frame comprises a central portion to which a swingarm supporting a driving wheel, or rear wheel, is hinged by means of a pin. Between the central portion and the steering tube, a front portion of the frame extends to which an engine which generates a driving torque is typically connected. This is transferred to the rear wheel through a mechanical chain transmission or through the use of a transmission shaft. The frame is completed by a rear portion which extends from the central portion towards the rear wheel and which typically supports the saddle of the vehicle.

In most of the known solutions, the rear part of the motor assembly is connected to the central part of the frame using the swingarm pin as a connection element. The front part of the motor assembly is instead connected to the front part of the frame and remains suspended underneath the same. Typically, a tank is connected to the front part of the frame containing the fuel necessary for the operation of the motor assembly.

Patent application EP3461729 describes a vehicle provided with a tank made of two superimposed parts in which a lower part extends between the two sides of the front part of the frame. The upper part is connected to the lower part and emerges markedly above the front part of the frame. The two parts of the tank are configured so as to define two side chambers that emerge outside the two sides. In order to allow the filling thereof, the tank comprises a feeding inlet which remains closed, by means of a removable cap, while the motorcycle is running. Such an inlet is defined in the highest part of the tank.

In the solution described in EP3461729, as well as in other conceptually similar ones, the tank is installed in a particularly advanced position of the frame, very close to the steering tube. The closing cap and the two side chambers are placed in a position adjacent to the steering assembly. As a result of this arrangement, the position of the center of gravity of the motorcycle in a full tank condition is significantly different from that with an empty tank. This translates into a different driving sensation for the rider who in full tank conditions will find the motorcycle more unbalanced forward, and therefore more difficult to control, than in the empty tank condition in which the center of gravity will be lower and more rearward. This drawback is extremely accentuated in enduro motorcycles which have a particularly large tank to ensure high autonomy.

The Applicant has therefore noted the need to provide a motor vehicle in which the imbalance effect due to the fuel contained in the tank is eliminated or strongly reduced.

SUMMARY

The main task of the present invention is therefore to provide a saddle riding vehicle which allows the limits indicated above to be overcome. Within this task, a first object of the present invention is to provide a saddle riding vehicle, particularly for enduro, in which the unbalancing effect, when the vehicle is full, is eliminated or at least reduced. Another object of the present invention is to provide a saddle riding vehicle in which the structure of the tank has no impact on the position of the other components of the vehicle and does not affect the vertical dimensions of the tank itself. Last but not least, an object of the present invention is to provide a saddle riding vehicle which is reliable and easy to be implemented in a cost-effective manner.

The Applicant has found that the intended task and objects can be achieved by extending the tank vertically so as to reduce the distance between the position of the center of gravity of the vehicle when the tank is full and the position of the center of gravity when the tank is empty. In particular, the predetermined objects are achieved by a saddle riding vehicle comprising a motor assembly and a frame to which the motor assembly is connected. The vehicle is provided with a tank supported by the frame and comprising a feeding inlet. The tank includes:

- a front part which comprises a steering tube to which a steering assembly which controls a front wheel is rotatably connected;
- a central part which comprises a swingarm to which a rear wheel is rotatably connected;
- a rear part extending from said central part in a direction opposite to the front part;
- a group of mechanical suspensions operatively interposed between the frame and the wheels of the vehicle, wherein said suspensions are configured to assume an extended condition and a compressed condition.

The vehicle is characterized in that the tank is a single monobloc tank and extends at least between said front part and said central part of said frame, said tank having a height greater than or equal to half an overall height of the vehicle. The overall height is the distance measured on said vehicle with fully extended suspension, between a ground support surface on which said vehicle rests and an upper end of said steering tube. The height of the tank, on the other hand, is the distance between said feeding inlet and the point of the tank closest to said support surface.

According to a possible embodiment, the tank, which extends at least between said front part, said central part and said rear part, has a longitudinal extension greater than half of the vehicle's wheelbase. In particular, the wheelbase of the vehicle is considered as the distance between the rotation axes of the two wheels of the vehicle, while the longitudinal extension of the tank is the length of the tank according to a direction orthogonal to the rotation axis of the rear wheel. The longitudinal extension of the tank and wheelbase are measured at fully extended suspension. Advantageously, the tank, considered in a side view, extends substantially above the motor assembly by the entire longitudinal length of the motor assembly itself. This solution leads to an advantageous condition whereby the center of mass of the tank is immediately above the center of mass of the motor and therefore in a position closest to the center of gravity of the vehicle.

According to a possible embodiment, the tank comprises at least a first section in a position proximal to the steering tube of the frame, wherein such an upper section comprises two side portions which depart from a central portion which defines the feeding inlet, said side portions being spaced apart from each other along the width direction.

Preferably, each of the side portions extends in an external position and adjacent to a corresponding front side of the front portion.

Always preferably said side portions, in a side view, extend at least partially astride the steering tube.

According to a possible embodiment, the tank further comprises a second section communicating with the first section and extending towards the rear wheel according to the upper profile of the front part of said frame and a third section communicating with the second section and included between the rear sides of the rear part of the frame.

According to an embodiment, the tank comprises a lower surface which includes a first surface portion referred to said first section, a second surface portion referred to said second section and a third surface portion referred to said third section. The first surface portion extends along a substantially horizontal plane; the second surface portion extends along an inclined plane in accordance with the upper profile, as seen in the longitudinal direction, of the front part of the frame; the third surface portion partially faces the central part of the frame and partially faces the rear wheel.

According to an embodiment, the central section of the tank is configured in such a way that its extension along the width direction of the vehicle is less than the distance between the front sides of the front part of the frame.

In a possible embodiment, the tank comprises an upper surface which includes a first surface portion, referred to said first section, a second surface portion referred to the second section; on said second surface portion of said upper surface rests at least in part a saddle of said vehicle.

In a possible embodiment, a first side portion of the tank is delimited internally by a first inner surface, at least partially flat, and externally by a first curved surface; similarly, the second side portion is delimited internally by a second inner surface, at least partially flat, and externally by a second curved surface; such curved surfaces impart an outwardly rounded shape to the side portions.

Preferably, the inner surfaces are longitudinally delimited by a transverse inner surface which extends along the width direction of the vehicle; the inner surfaces (side and transverse) define as a whole a recess of the first section of the tank having a substantially polygonal shape with respect to a plan view of the tank.

In an embodiment thereof, the transverse inner surface is located in a position spaced from the steering tube so that the recess of the first section defines a space in which a component accessory for the operation of the motor assembly is positioned.

According to a possible embodiment thereof, the front part of the frame comprises at least one transverse element which extends in the width direction of the vehicle connecting the front sides; the position of the transverse element identifies, for each of the front sides, a first trellis portion which extends from the steering tube to the transverse element and a second portion which extends between the corresponding first portion and the central part of the frame.

According to a possible embodiment, the recess of the first section of the tank extends from the steering tube to a position close to said transverse element.

In one embodiment, the tank is fixed, directly or indirectly, to each of said front sides substantially proximal to the transverse element; the tank rests, for each of the front sides, on a component of the corresponding first trellis portion.

Preferably, the first section of the tank is connected to each of the front sides of the frame through a pair of connecting brackets each of which extends from a corresponding one of said side portions.

In one embodiment, the tank is supported by fastening means installed at the rear part of the frame. Preferably, the fastening means comprise a transverse bracket to which the second section of the tank is connected; such a transverse bracket extends between the rear sides of the rear part of the frame.

Preferably, the tank is fixed to the front portion and/or to the rear portion of the frame such that, for each of the front sides, the second section of the tank is located above the second portion of the corresponding front side.

In a preferred embodiment, the tank has a decreasing extension, along the width direction of the vehicle, from said second section to said third section, according to a plan view of the tank.

LIST OF FIGURES

Further features and advantages of the invention will become clearer from the examination of the following detailed description of some preferred, but not exclusive, embodiments of the vehicle, illustrated by way of non-limiting example, with the aid of the enclosed drawings, in which.

The same reference numerals and letters in the figures identify the same elements or components.

DETAILED DESCRIPTION

Figure 1:
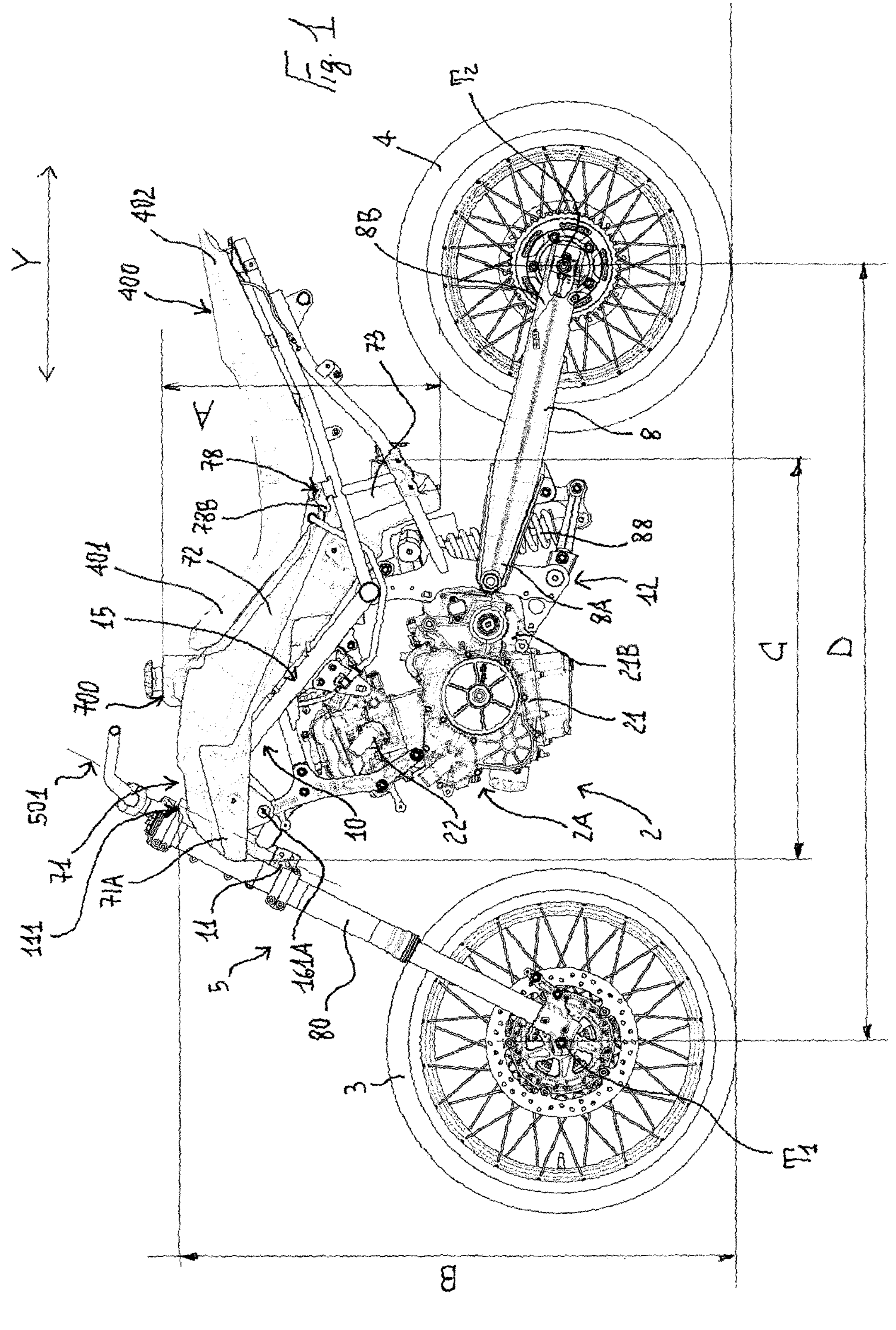
FIG. 1 is a side view of a saddle riding vehicle according to the present invention.

With reference to the aforementioned figures, the present invention therefore relates to a saddle riding vehicle, meaning by this expression any two-wheeled moped or motorcycle, i.e. provided with a front wheel and a rear wheel. In the following description, the vehicle 1 will also be indicated with the expression motor vehicle 1 or motorcycle 1.

The motorcycle 1 comprises a motor assembly 2 and a frame 10 to which the motor assembly 2 is connected. The frame 10 comprises a front part 15 which includes a steering tube 11 to which a steering assembly 5, which controls a steering wheel 3 (or front wheel 3), is rotatably connected. The configuration of the steering assembly, known to a man skilled in the art, is not relevant for the present invention.

The vehicle 1 comprises a tank 7 to contain the liquid fuel necessary for the operation of the motor assembly 2. The tank 7 comprises a feeding inlet 700, closed by a removable cap, to allow the filling thereof. The vehicle 1 is provided with a fuel suction device 750 having a per se known configuration.

The frame 10 comprises a central part 12 to which a first end 8A of a swingarm 8 is hinged. A driving wheel 4 (or rear wheel 4) is rotatably connected to a second end 8B of the swingarm 8. According to a widely known technical solution, and for this reason not described in detail, the drive torque generated by the motor assembly 2 is transferred to the driving wheel 4 through a mechanical transmission, for example of the chain type.

The front part 15 of the frame 10 extends between the steering tube 11 and the central part 12. The front part 15 includes a first front side 15A and a second front side 15B which are spaced apart in the width direction X of the vehicle.

The frame 10 also comprises a rear part 18 which extends from the central part 12 in the opposite direction to the front part 15, i.e. towards the rear wheel 4. Typically, the rear part 18 supports at least the rear part of the saddle 400 of the vehicle 1. The rear part 18 comprises a first rear side 18A and a second rear side 18B spaced apart in the width direction X of the vehicle. With respect to a vertical reference plane PV contending the steering axis 501, the first rear side 18A is in the same half space and adjacent to the first front side 15A. Similarly, the second rear side 18B extends in the same half space and adjacent to the second front side 15B.

In the remainder of the description, the sides 15A, 15B of the front part 15 will be referred to simply as "front sides 15A, 15B", while the rear sides 18A, 18B will be referred to as "rear sides 18A, 18B".

The expression "steering axis" indicates the rotation axis configured by the steering tube 11 for the steering assembly 5.

For the purposes of the present invention, the expression "width X", "width direction X" or "transverse direction X" is meant to indicate a direction substantially parallel to the rotation axis T2 of the rear wheel. Instead, the expression "length direction" or "longitudinal direction Y" is meant to indicate a direction substantially orthogonal to the transverse direction (i.e. orthogonal to said rotation axis T2).

For the purposes of the present invention, the terms "upper" and "lower" refer, respectively, to the position furthest from and closest to a reference plane PO (indicated in FIG. 1) on which the vehicle 1 rests. The terms "inferiorly" and "superiorly" therefore indicate the position of a part or an end of a component which is furthest from or closest to said reference plane PO.

The vehicle 1 comprises suspension means interposed between said frame 10 and said wheels 3, 4 having a per se known configuration. The suspension means comprise a plurality of mechanical suspensions configured to assume a compressed configuration, due to the loads imposed on the vehicle, and an extended configuration, characteristic of a condition of absence of loads bearing on the vehicle. In the illustrated solution, the suspension means comprise two front suspensions 80 and a rear shock absorber 88 interposed between the swingarm and the frame 10.

With reference to FIG. 1, according to the present invention the tank 7 is made as a single monobloc tank. Said tank 7 extends at least between said front part and said central part. In particular, the tank 7 extends for a height (indicated with A) greater than or equal to half the overall height (indicated with B) of the vehicle 1. The overall height B of the vehicle corresponds to the distance between a support surface PO on the ground, on which the vehicle 1 rests, and the upper end 111 of the steering tube 11. The height of the tank 7, on the other hand, is considered as the distance between the feeding inlet 700 of the tank 7 and the point of the latter closest to the support plane P0.

For the purposes of the present invention, the two subject heights (height A and height B) are considered in a condition of fully extended suspensions, i.e. in a condition in which the vehicle 1 is unloaded, stationary, without the rider, and with an empty tank 7. In other words, in a condition in which there are no loads acting on the vehicle 1 other than those relating to the masses of the vehicle.

Still with reference to FIG. 1, according to a possible embodiment, the tank 7 extends between the front part 15, the central part 12 and the rear part 18 of the frame 10 and has a longitudinal extension (indicated with C), greater than half the wheelbase (indicated with D) of the vehicle 1. The wheelbase D of the vehicle 1 is the distance between the rotation axes T1, T2 of the two wheels 3, 4 of the vehicle 1 when both wheels 3,4 are on the same plane, i.e. when the front wheel 3 is coplanar to the rear wheel 4. The longitudinal extension C of the tank 7 corresponding to its length measured along a longitudinal direction Y orthogonal to the rotation axis T2 of the rear wheel 4. Again, the longitudinal extension C and the wheelbase D are considered in a condition of fully extended suspension.

According to a possible embodiment, the tank 7, considered in a side view of the vehicle 1 as in FIG. 1, extends above the motor assembly 2 for the entire longitudinal length of the motor assembly itself. In other words, the tank 7 is located above the motor assembly 2 and is equal to or longer than the motor assembly 2, again considering these components (tank 7 and motor assembly 2) in the side view of FIG. 1. As indicated above, this condition allows bringing the center of mass of the tank 7 closer to that of the motor assembly 2 and therefore in general to that of the vehicle 1 to the advantage of greater stability even in full tank conditions.

According to a possible embodiment, the tank 7 comprises an upper section 71 (or first section 71) in a position close to the steering tube 11. This first section 71 includes two side portions 71A, 71B which extend, by at least a section, spaced in the width direction X of the motorcycle 1. Said side portions 71A, 71B depart from a central portion 71C at which the feeding inlet 700 for filling the tank 7 is defined.

As illustrated, preferably, the two side portions 71A, 71B emerge outside the space defined between the front sides 15A, 15B of the front part 15 of the frame 10. Always preferably, each of said side portions 71A, 71B is located in an outer position adjacent to a corresponding one of said front sides 15A, 15B.

Even more preferably, the side portions 71A 71B, considered in a side view, extend at least partially astride the steering tube 11. In other words, the side portions 71A 71B, in a side view, are at least partially superimposed on the steering tube 11. This configuration identifies the extension of the tank 7, which extends substantially from the steering tube 11 of the motor vehicle 1, towards the central part 12 of the frame 10, up to, in certain cases, also in the rear part 18 thereof. A tank 7 thus shaped is therefore more capacious, for the same overall dimensions (by using a space next to the steering tube which is notoriously unused), and its longitudinal extension, which follows the extension of the motor vehicle 1, allows the distribution of the masses on the motorcycle 1 to be optimized.

According to a possible embodiment shown in the figures, the body of the tank 7 comprises a central section 72 (or second section 72), communicating with the upper section 71, which extends according to the upper profile, as seen in the longitudinal direction, of the front part 15 of the frame 10. In other words, this profile is seen on a longitudinal plane of the motorcycle 1. The expression "longitudinal plane" means a vertical plane substantially orthogonal to the rotation axis of the rear wheel 4. Furthermore, the tank 7 also comprises a lower section 73 (or third section 73), communicating with the central section 72 and extending between the rear sides 18A, 18B of the rear part 18 of the frame 10, in a position comprised between the central part 12 of the frame 10 and the rear wheel 4. The third section 73 is identified by the volume of the tank 7 which is located between the rear sides 18A, 18B and which remains below the upper profile of the rear part 15, where this rear profile is seen with respect to a side plane (FIG. 1).

For the purposes of the present invention, the terms "upper" and "lower" refer to the position furthest from and closest to, respectively, a reference plane PO (indicated in FIG. 1) on which the vehicle 1 rests. The terms "below" and "above" have a similar meaning.

Overall, therefore, according to the present invention, the tank 7 has an elongated configuration which substantially extends along the entire length of the front part 15 of the frame 10, even occupying a space between the rear sides of the frame 18A, 18B. This condition also contributes to making the position of the center of gravity of the vehicle 1, in an empty tank condition, in any case close to that occupied with a full tank. Therefore, when the tank is full, the feeling of imbalance for the rider is strongly contained, if not completely eliminated.

The fuel suction device 750 is operatively connected to the tank 2 and, as mentioned above, has a configuration per se known to a man skilled in the art, comprising a fuel suction pump (not shown) located inside the tank 2. In this regard, according to the invention, this suction pump is inserted in the third section 73, so as to suck the fuel in the lowest point of the tank 7. According to a preferred embodiment, visible in particular in FIG. 3, the central section 72 of the tank 7 is configured in such a way that its extension, measured in the width direction X of the motorcycle 2, is less than the distance between the front sides 15A, 15B of the frame 10. In other words, with respect to a plan view of the tank 7, the transverse extension of the central section 72 is smaller than the transverse extension of the front part 15 of the frame 10. According to this embodiment, the second section 72 is identified by the volume of the tank 7 which remains included laterally between the front sides 15A, 15B and the rear sides 18A, 18B mainly, and preferably completely, above the upper profile of the front part 15 and of the rear part 18 of the frame 10.

As already indicated above, the lower section 73 however remains included between the rear sides 18A, 18B of the rear portion 18, but below said upper profile of the rear part 18. In other words, the width of the third section 73 is always less than the transverse distance between said rear frame sides 18A, 18B.

Figure 2:
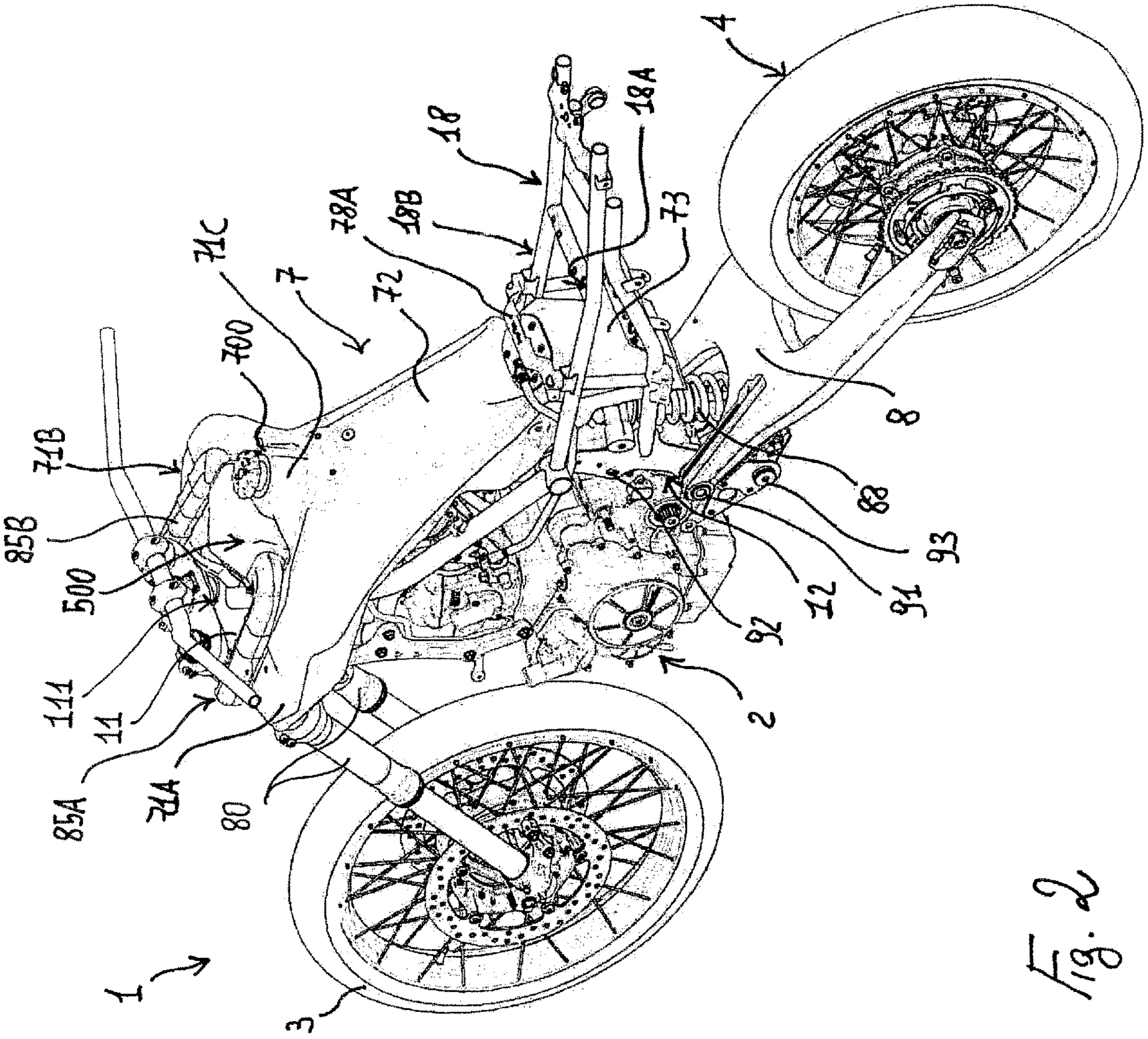
FIG. 2 is a perspective view of the vehicle of FIG. 1 without the saddle.
Figure 3:
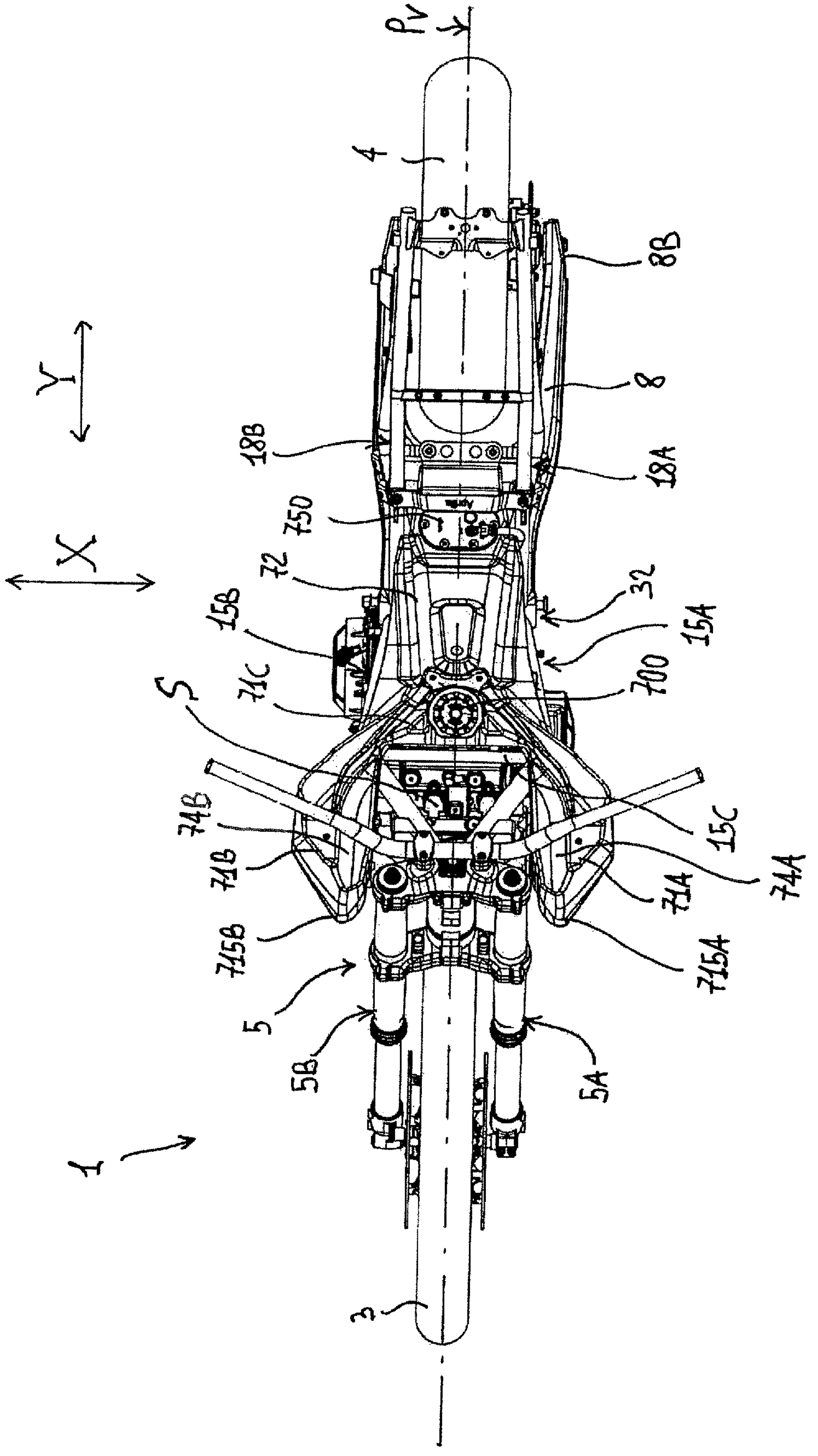
FIG. 3 is a plan view of the vehicle of FIG. 1 without the saddle and the air filter box.

FIGS. 1 to 3 show a possible embodiment of the motorcycle 1 according to the invention. The motor assembly 2 comprises at least one thermal engine 2A, which generates the driving torque transferred to the driving wheel 4 through the aforementioned transmission. The thermal engine 2A comprises a base 21 and a head 22 which emerges above the base 21. The term "head 22" is intended to indicate the upper part of the engine which closes the cylinders and incorporates the combustion chambers. For the purposes of the present invention, the term "base" is meant to indicate the rest of the motor assembly, therefore not only the part in which the motor shaft rotates and in which it moves, but also the other motion transmission parts included between the motor shaft and the transmission to the rear wheel. These "transmission parts" therefore include the clutch and the gear change, where the clutch, as known, will be interposed between the motor shaft and the gearbox to allow a gradual start and to change gears.

According to a possible embodiment, the rear part 21B of the base 21 of the motor assembly 2 is connected, preferably directly and to the central part 12 of the frame 10 through a plurality of connecting elements 91, 92, 93. The plates 16A, 16B, on the other hand, are designed to support the head 22 of the heat engine 2A and/or the front part of the base 21. According to a per se known solution, one of the connecting elements 91 corresponding to the pin which allows the swingarm 8, or the rear wheel 4, to oscillate with respect to the frame 10.

Figure 10:
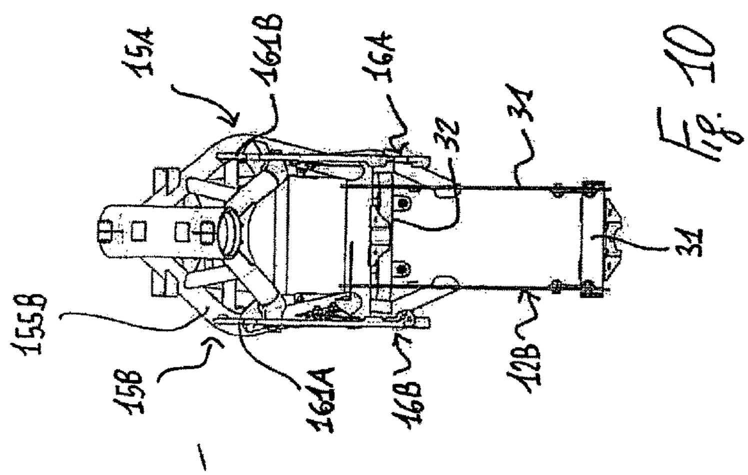

The motor assembly 2 is supported by the front part 15 of the frame 10. For this purpose, in the possible, and therefore non-exclusive, embodiment shown in the figures, two first connection plates 16A, 16B (indicated in FIGS. 10 and 11) are provided to connect the head 22 and the front part 21A of the base 21 to the front part 15 of the frame 10. In detail, a first plate 16A connects the motor assembly 2 to the first frame side 15A and a second plate 16B connects the motor assembly 2 to the second frame side 15B. In the solution shown in the figures, two second plates 17A, 17B are also provided, each to connect one of said front sides 15A, 15B to the head 22 of the motor assembly 2 in a position closer to the central portion 12 with respect to the position occupied by a corresponding one of said first plates 16A, 16B. Alternatively, however, the motor assembly 2 may be connected directly to the frame 10 without using the indicated plates. The way in which the motor assembly 1 is connected to the frame 10 is not however relevant for the purposes of the present invention.

With reference to FIG. 1, the motor assembly 2 remains in any case included, in the length direction Y, between the position of the steering assembly 5 and the central part 12 of the frame 10. Therefore, the motor assembly 2 does not extend rearward beyond the central part 12. As clearly visible from FIG. 1, the upper section 71 and the central section 72 of the tank 7 are mainly located in a position above the motor assembly 2. Instead, the lower section 73 of the tank 7 is located on the opposite side of the motor assembly 2, with respect to the central part 12 of the frame 10.

Figure 5:
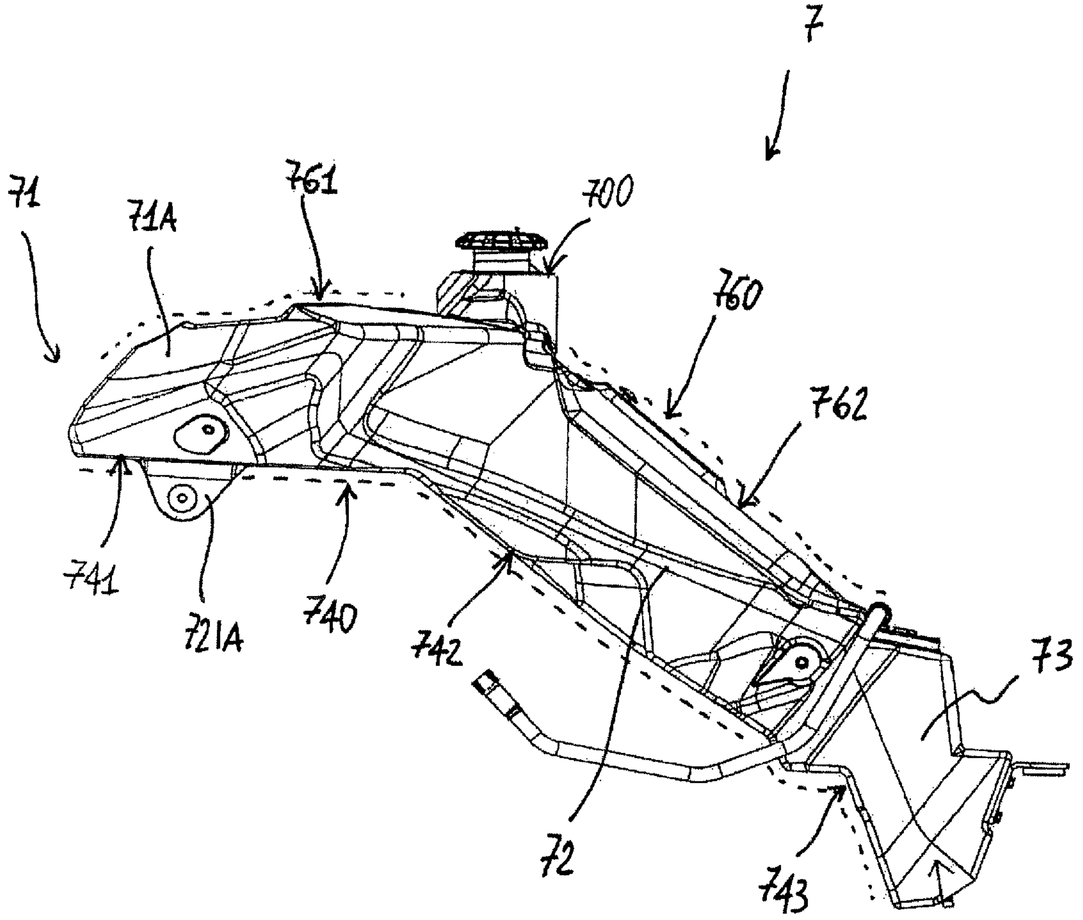

The tank 7 comprises a lower surface 740 (highlighted with a dashed line in FIG. 5) that includes a first surface portion 741, a second surface portion 742 and a third surface portion 743 of the first section 71, the second section 72 and the third section 73, respectively. The expression "lower surface 740" is intended to substantially indicate the surface of the tank 7 which remains facing the support plane PO of the motorcycle, i.e. the surface closest to the ground.

According to a preferred embodiment, shown in the figures, the first surface portion 741 extends parallel, or in any case slightly inclined, to the support plane PO of the motorcycle 1. The second surface portion 742 extends inclined with respect to the first surface portion 741 according to the upper profile, considered in the longitudinal direction, of the front part 15 of the frame 10. Finally, the third surface portion 743 remains partially facing the central portion 12 of the frame 10 and partially facing the rear wheel 4, again considering this condition on a longitudinal plane.

Therefore, the two side portions 71A, 71B of the first section 71 have a substantially planiform lower surface, while the lower surface of the other sections 72, 73 substantially follows the pattern of the frame 10.

The tank 7 also comprises an upper surface 760 (highlighted by the dashed line hatching in FIG. 5), meaning with this expression the surface opposite to the lower one, that is, the one that remains facing upwards or towards the rider. In particular, the upper surface 760 comprises a first surface portion 761 of the first section 71 of the tank 7 and a second surface portion 762 of the second portion 72. According to the invention, a front portion 401 of the vehicle saddle 400 rests at least partially on the second surface portion 761, as can be seen in FIG. 1. A rear portion 402 instead rests on the rear part 18 of the frame. The third section 73 of the tank 7 is placed under the saddle 400 in a longitudinal position close to the lowest point of the saddle 400.

Figure 7:
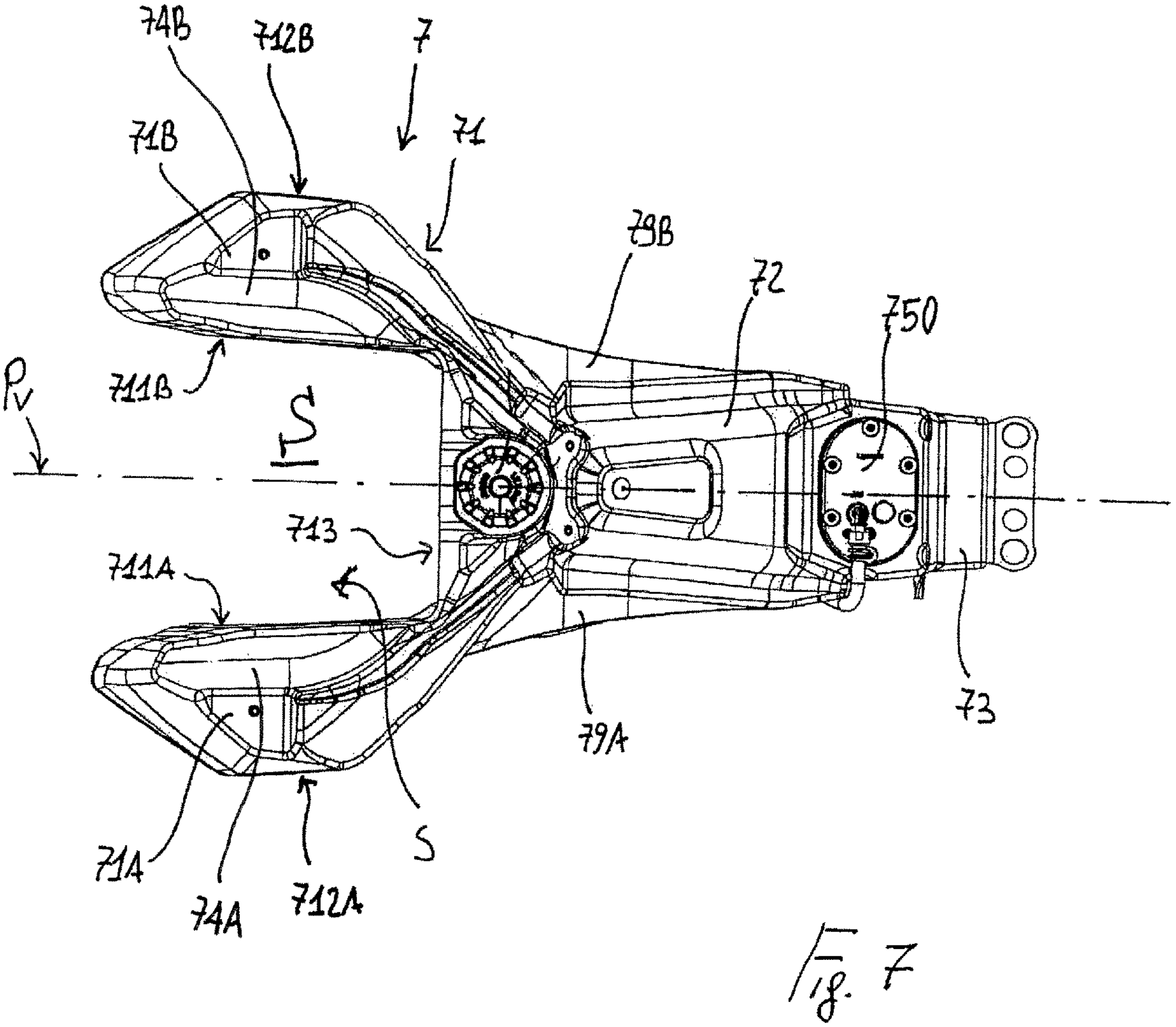
Figure 8:
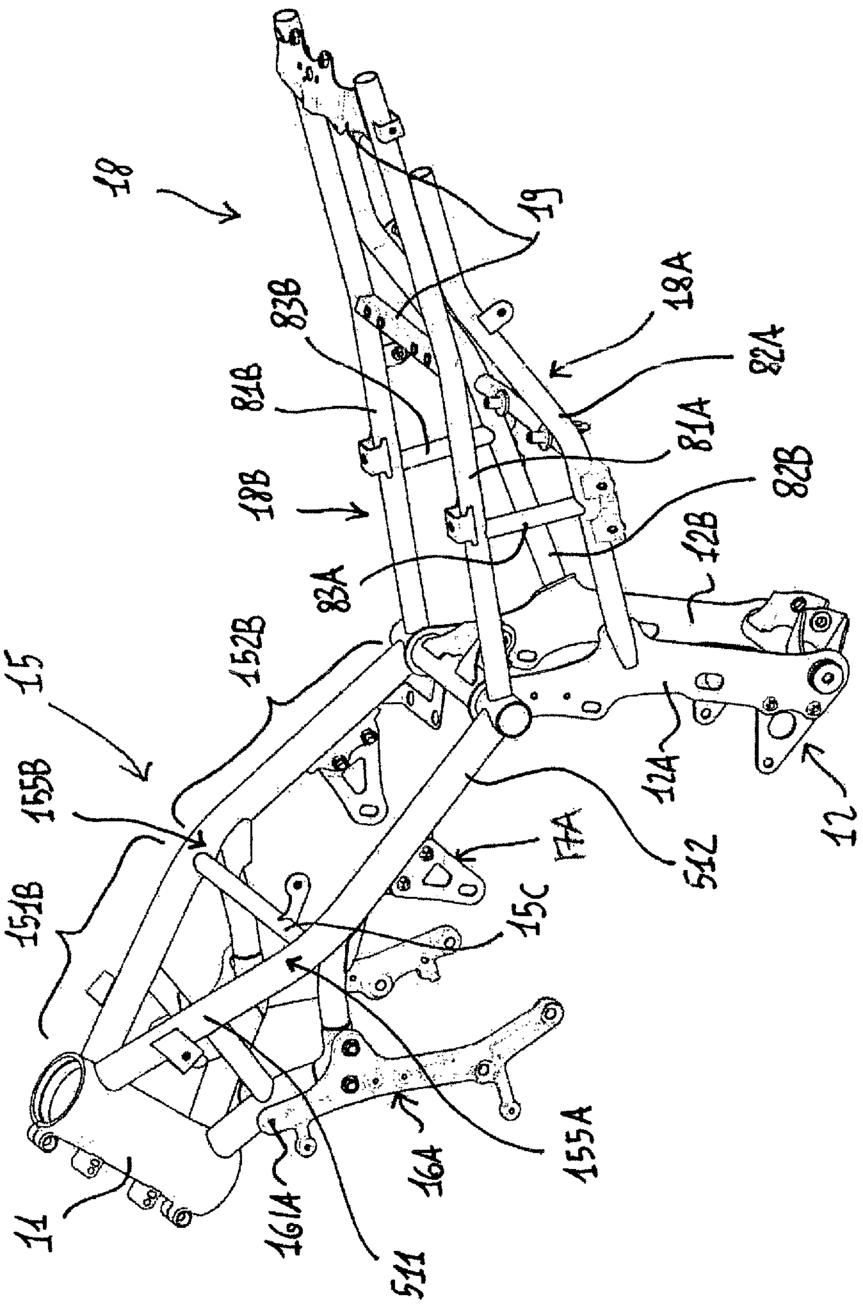
FIGS. 8 to 11 are a perspective view, a side view, a front view and a plan view, respectively, of a frame of a vehicle according to the present invention.

According to a preferred embodiment, visible in particular in FIGS. 3 and 7, the first portion 71A of the tank 7 is delimited internally by a first flat planiform inner surface 711A and externally by a second curved surface 712A. Similarly, the second chamber 71B is delimited internally by a second planiform inner surface 711B and externally by a second curved surface 712B (see FIG. 7). In particular, the two curved surfaces 712A, 712B impart an outwardly rounded shape to the two chambers 71A, 71B. The two chambers 71A, 71B are substantially specular with respect to the vertical plane PV passing through the steering axis 401.

The two inner surfaces 711A, 711B are longitudinally delimited by a transverse inner surface 713 which extends in the width direction X of the motorcycle 1. Overall, the inner surfaces 711A, 711B, and the transverse surface 713 define a recess of the first polygonal section 71 with respect to a plan view of the tank 7 (see FIG. 7). The transverse surface 713 is located in a position spaced from the steering tube 11 so that said recess defines a space (indicated with S) useful for positioning a component accessory for the operation of the motor assembly 2.

In particular, according to a preferred embodiment, this accessory component is the box containing the air filter which typically, in known solutions, is placed below the tank or in any case in a position that is difficult to access. Advantageously, the recess defined between the side portions 71A, 71B allows the filter to be placed in a more comfortable position, easily accessible for any inspection and maintenance operations.

With reference in particular to FIG. 3, it can be seen that the two side chambers 71A, 71B extend forward so as to be at least partially flanked to the steering tube 11 and preferably also to the steering assembly 5. In FIG. 3 the references 715A, 715B indicate the ends of the two side chambers 71A, 71B which are placed side by side with a corresponding side 5A, 5B of the steering assembly 5.

FIGS. 8 to 11 allow observing a preferred embodiment of the frame 10 according to the invention. The front sides 15A, 15B, as well as the rear sides 18A, 18B have a substantially specular conformation with respect to the vertical plane PV defined above. Similarly, the central part 12 is also specular with respect to the vertical plane PV. The central part 12 comprises a first flank 12A and a second flank 12B opposite to each other. Such flanks 12A, 12B are preferably formed by plate-shaped bodies and are connected by a lower pin 31 and an upper pin 32 which extend in the width direction X of the vehicle. With respect to the vertical plane PV defined above, the first flank 12A is located on the same side as the first front side 15A and the first rear side 18A, while the second flank 12B is located on the same side as the second front side 15B and the second rear side 18B.

The front part 15 of the frame 10 comprises at least one transverse element 15C which extends in the width direction X connecting the two front sides 15A, 15B. For each of these, the position of the transverse element 15C identifies a first portion 151A, 151B which extends from the steering tube 11 up to the same transverse element 15C and a second portion 152A-152B which extends between the corresponding first portion 151A, 151B and the central part 12 of the frame 10.

Figure 11:
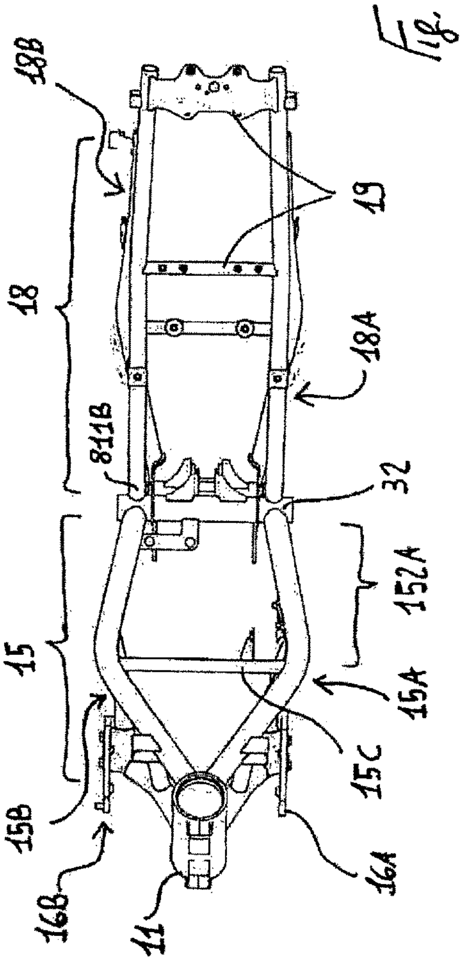

As can be seen in FIG. 11, substantially in proximity to the longitudinal position of the transverse element 15C, the front part 15 of the frame 10 has its maximum extension in the width direction X. The first portion 151A of the first front side 15A and the first portion 151B of the second front side 5B converge towards the steering tube 11. Instead, the second portion 152A of the first front side 15A and the second portion 152B of the second front side 15B converge towards the central part 12. It is however seen that, for each frame side 15A, 15B, the inclination of the front portion 151A, 151B towards the vertical plane PV (containing the steering axis 501) is greater than the inclination of the corresponding rear portion 152A, 152B towards the same plane.

The polygonal recess defined by the inner surfaces 711A, 711B and 713, preferably extends between the steering tube 11 and substantially the transverse element 15C indicated above. In other words, all the space above the first portion 151A, 151B of the front sides 15A, 15B can be used for the positioning of one or more accessory components of the motor assembly 2 or generically for another component of the motorcycle 1.

For each front side 15A, 15B, the first part 151A, 151B has a substantially reticular or trellis configuration in which it is possible to identify a plurality of components 52A, 52B-53A, 53B-54A, 54B. Preferably, the latter have a tubular shape.

The second part 152A, 152B has a single component configuration (i.e. comprising a single component) which extends between the corresponding first part 151A, 151B and the central part 12 of the frame 10.

With reference to FIGS. 1, 2 and 3, according to a preferred embodiment, the tank 7 is fixed, directly or indirectly, to each front side 15A, 15B on the front part 15 of the frame 10 substantially in a position proximal to the transverse element 15. In particular, for each front side of frame 15A, 15B the tank 7 is fixed to, and rests on, a component of the corresponding first portion 151A, 151B with a reticular or trellis configuration.

The first section 71 of the tank 7 is fixed to each front side 15A, 15B through a pair of connecting brackets 721A, 721B. Each of these extends from one of the side portions 71A, 71B.

Preferably each side portion 71A, 71B is connected to an upper end 161A, 161B of a corresponding one of the first plates 16A, 16B designed to support and to connect the motor assembly 2 to the frame 10. Therefore, in this embodiment the first section 71 is, overall, connected to the frame 10 indirectly through the first plates 16A, 16B.

The front sides 15A, 15B each comprise an upper element 155A, 155B of which a front section 511 is a component of the corresponding first portion 151A, 151B, while a rear section 512 defines the corresponding second portion 152A, 152B. The upper element 155 of the first front side 15A and the upper element 155B of the second frame front side 15B extend on a first inclined plane P1 (indicated in FIG. 9). The upper elements 155A, 155B of the front sides 15A, 15B are connected to the central part 12 of the frame 10 at opposite ends of the upper pin 32 indicated above. The upper elements 155A, 155B essentially define the upper profile of the front part 15 of the frame 10.

The rear sides 18A, 18B are connected to each other in the width of the vehicle through one or more transverse connecting elements 19. In general, the rear part 18 can be made from a plurality of tubular components welded together and made of the same material of which the other portions 12, 15 of the frame 10 are made.

Each rear side 18A, 18B comprises at least one upper element 81A, 81B of which a front end 811A, 811B is connected to the central portion 12, preferably to an end of the upper pin 32 opposite to a corresponding upper element 155A, 155B of the front part 15. Such upper elements 81A, 81B essentially define the upper profile of the rear part 18 of the frame 10.

Each rear side 18A, 18B further comprises a lower element 82A, 82B connected to the upper one through a connecting element 83A, 83B.

Figure 9:
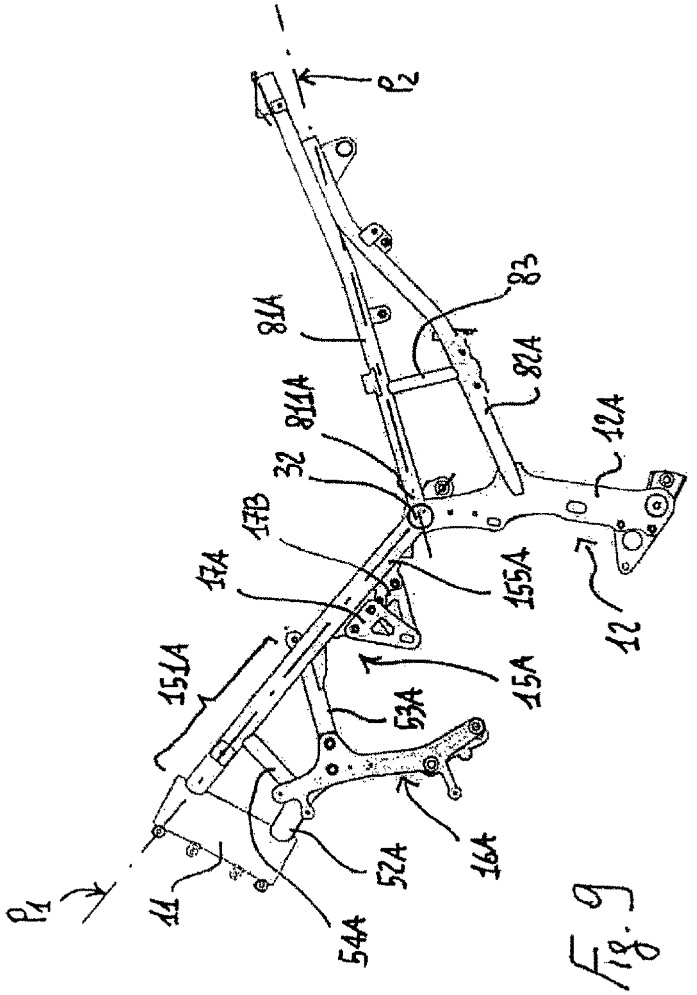

The upper element 81A of the first side 18A and the upper element 81B of the second rear side 18B extend parallel for at least a portion thereof identifying a second inclined plane P2 (also indicated in FIG. 9).

The first inclined plane P1 and the second inclined plane P2 substantially intersect at the upper pin 32 of the central portion 12 and together with a corresponding flank 12A, 12B of the central part 12 give the frame 10 a substantially Y-shape with respect to a view side thereof visible in FIG. 9.

According to a preferred embodiment, the tank 7 is supported at the back via fixing means 78 connected to the rear part 18 of the frame. In a preferred embodiment visible in FIGS. 1 and 2, these fixing means 78 comprise a transverse bracket 78A to which the second section 72 of the tank 7 is connected through screw connecting elements 78B or other functionally equivalent elements. Preferably, the transverse bracket 78A emerges above the rear sides 18A, 18B so that the tank 7 is suspended below it.

According to a preferred embodiment, the tank 7 is fixed either to the front portion 15 of the frame 10 and/or to the rear portion 18 in such a way that, for each of the two front sides 15A, 15B, the second section 72 of the tank 7 remains above the corresponding second portion 152A, 152B (see FIG. 3 in this regard) or above the plane P1 indicated above.

With reference to FIGS. 3 and 7, the second section 72 of the tank 7 has a width (extension in the transverse direction X) which decreases towards the third section 73. In other words, the width of the second section 72 decreases from a maximum value, at the connection with the first section 71, to a minimum value at the connection with the third section 73. Basically, with reference to a plan view (FIG. 7), the second section 72 has a substantially "funnel" conformation towards the third section 73. This conformation is imparted by two connecting portions 79A, 79B which develop laterally from each of the two side chambers 71A, 71B up to the base of the second section 72, i.e. up to the connection of the latter with the third section 73.

Figure 4:
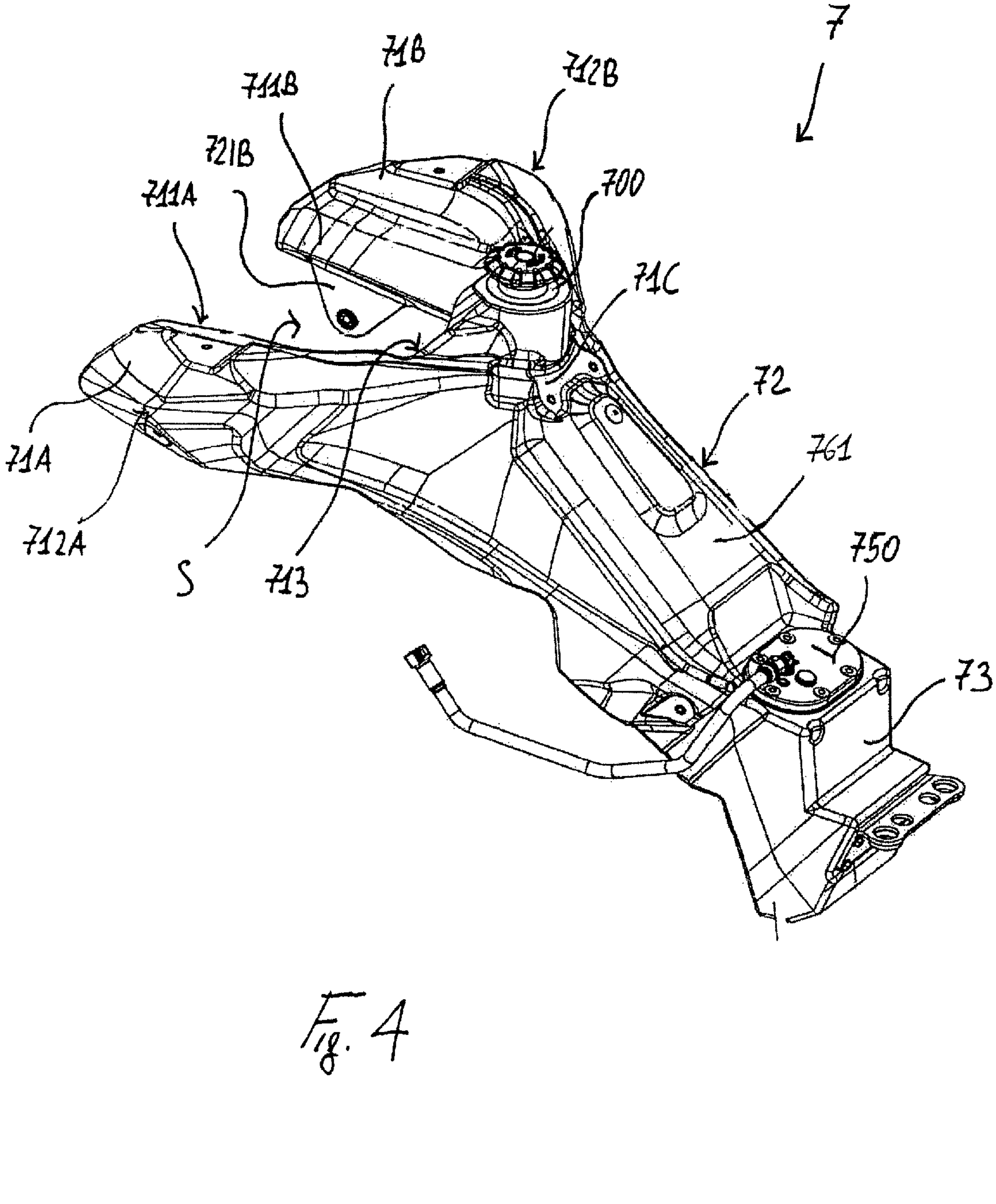
FIGS. 4 to 7 are a perspective view, a side view, a front view and a plan view, respectively, of a tank of a vehicle according to the present invention.

With reference to FIGS. 4 and 7, according to an embodiment, the feeding device 750 is operationally installed as a bridge between the second section 72 and the third section 73 and occupies a position substantially below the saddle of the motorcycle 400. Advantageously, the simple removal of the saddle 400 allows easy access to the device 750 for any maintenance or inspection operations.

According to a preferred embodiment, the third section 73 of the tank 7 is located in a position sufficiently distant from the second part 12 of the frame 10 to allow the positioning of a shock absorber 88 immediately in contact with the same central portion. As shown in the figures, preferably, the third section 73 has a downward tapered conformation with respect to a side view (FIG. 1) of the motorcycle. At the same time, the third section 73 has a tapered conformation towards the lower end also with respect to a plan view (FIG. 3) of the motorcycle.

Figure 12:
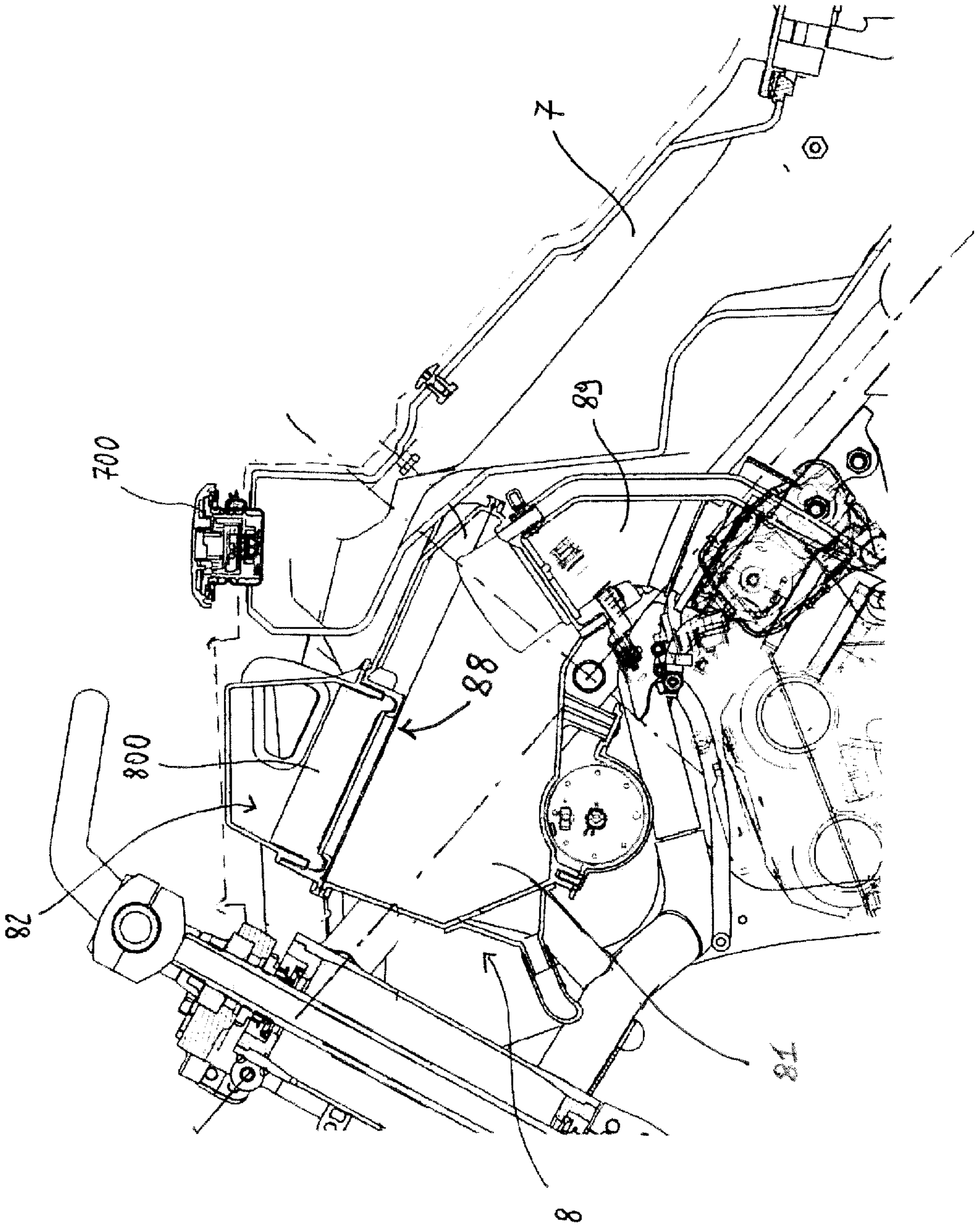
FIG. 12 is a partially sectioned side view to show a possible embodiment of an air filter of a vehicle according to the invention.
Figure 13:
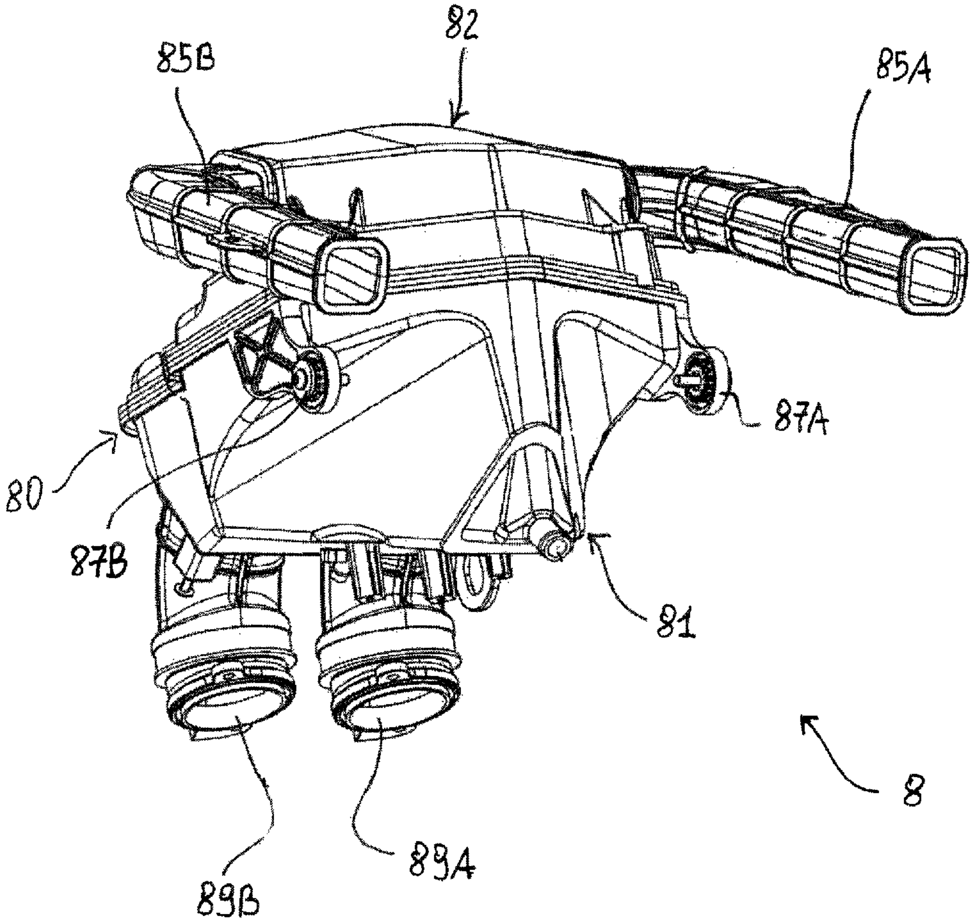
FIG. 13 is a perspective view of the filter shown in FIG. 12.

In one of its possible embodiments, the vehicle also comprises an air filter 8, (see FIGS. 2, 12 and 13) installed on the front part 15 of the frame and 10 comprising a box 80 containing at least one filtering element 800.

The filter box 80 comprises a lower hollow body 81, fixed to the front part 15 of the frame 10 by means of suitable fixing means 87A-87B. The box 80 further comprises an upper hollow body 82 connected in a removable manner to the lower hollow body 81, wherein at least one air intake duct 85A, 85B is connected to the upper hollow body 82 and wherein at least one air delivery duct 89A, 89B is connected to the lower hollow body. The hollow bodies 81, 82 are communicating through an opening 88 whereby the air sucked into the upper hollow body 82 passes into the lower hollow body 81. According to the invention, the upper hollow body 82 occupies a position, considered along the length of the vehicle, comprised between the steering tube 11 and the tank 7 of the vehicle 1, wherein no part of the tank 7 stand above the upper hollow body 82 of the filter 8.

The two-piece conformation of the filter 8 and the arrangement of the upper hollow body 82 make the inspection and/or maintenance of the filter 8 particularly simple for the motorcyclist who can also perform it while sitting on the saddle of the motor vehicle 1.

The filtering element 800 is installed inside the upper hollow body 82 and extends above said opening 88 occupying the entire width thereof. In this way, by removing the upper hollow body 82, the rider has immediate access to the filtering element 800 which can be removed together with the same upper hollow body 82.

Figure 6:
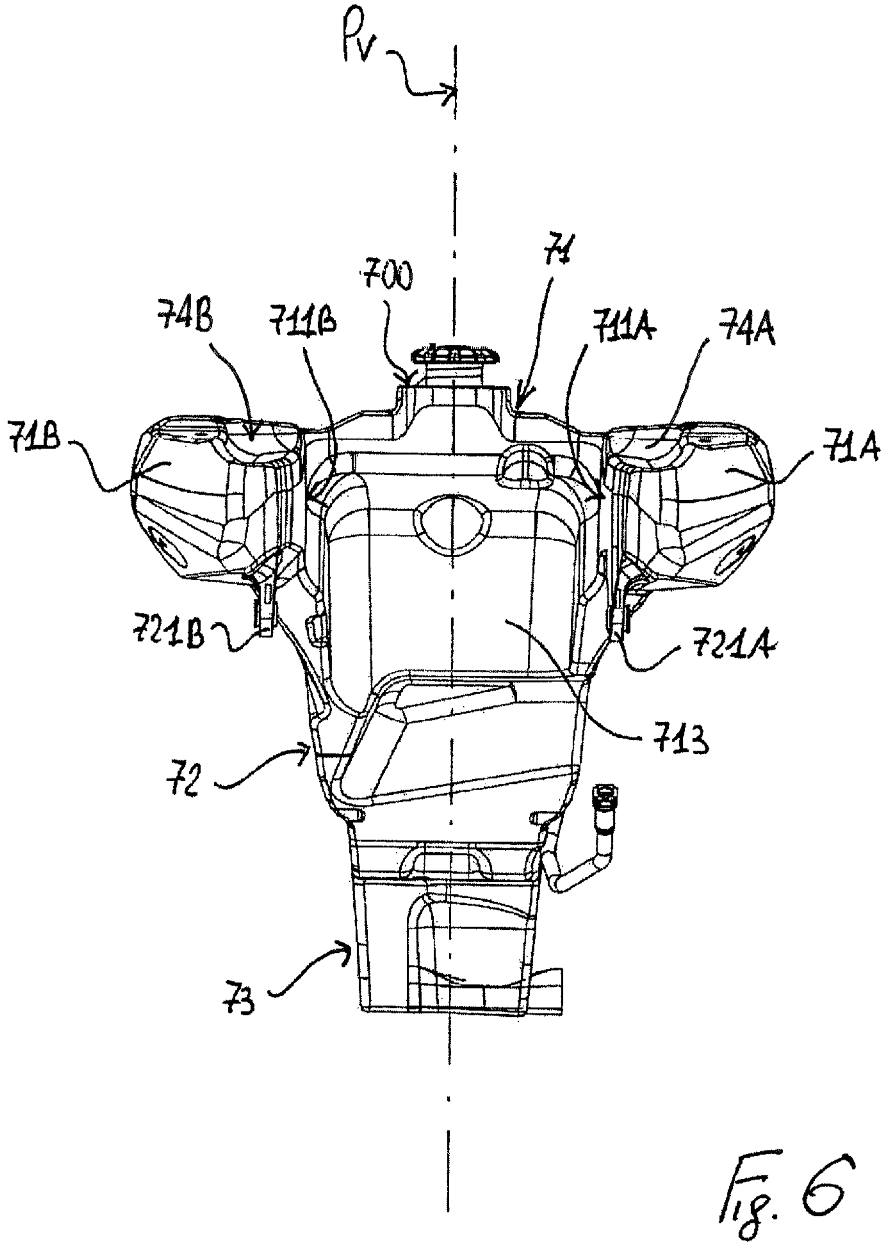

According to a possible embodiment, the filter 8 comprises two intake ducts 85A, 85B which emerge on opposite sides of the upper hollow body 82 in the direction of the front wheel 3; the two intake ducts 85A, 85B are substantially specular with respect to a vertical reference plane containing the steering axis 501 (see FIG. 2). According to a preferred embodiment, each of the side portions 71A, 71B of the first section 71 of the tank 7 supports a corresponding intake ducts 85A, 85B. More precisely, each of said side portions 71A, 71B defines a seat 74A, 74B (indicated for example in FIGS. 6 and 7) in which a corresponding one of said suction elements 85A, 85B is positioned or on which at least rests.

In a possible embodiment, the lower hollow body 81 is located at least partially below the central portion 71C of the first section 71 of the tank 7.

In another possible embodiment, the air delivery ducts 89A, 89B are instead located partially below the central portion 71C of the first section 71 and/or partially below the second section 72 of the tank 7 defined above, wherein such a second section has an extension, measured in the direction of the vehicle width, less than the distance between the front sides 15A, 15B of the frame 10.

The technical solutions described above allow fully accomplishing the intended tasks and objects. In particular, the elongated shape of the tank allows eliminating, or in any case strongly attenuating, the imbalance effect of the vehicle when the tank is full. In particular, the single-component configuration of the tank allows the fuel to flow continuously towards the lower part of the tank in order to optimize the position of the vehicle's center of gravity in any driving condition and with any level of fuel inside the tank.

The invention claimed is:

1. A saddle-riding vehicle comprising:

a motor assembly, a frame to which said motor assembly is connected, and a tank supported by said frame and having a fuel feeding inlet, wherein said frame comprises:

a front part which comprises a steering tube to which a steering assembly which controls a front wheel is rotatably connected;

a central part which comprises a swingarm to which a rear wheel is rotatably connected;

a rear part extending from said central part in a direction opposite to said front part; and a front mechanical suspension and a rear mechanical suspension operatively interposed between said frame and respectively a front wheel and a rear wheel, each of the mechanical suspensions being configured to assume an extended or compressed configuration, wherein said tank is a single monobloc tank and extends between said front part and said central part of said frame, said tank having a height greater than or equal to half an overall height of the vehicle, wherein said overall height is the distance, measured on said saddle riding vehicle with fully extended suspensions, between a support surface on the ground on which said vehicle rests and the upper end of said steering tube, and wherein said height of said tank is the distance between said feeding inlet and a point of said tank closest to said support surface;

wherein said tank comprises a first tank section in a position proximal to said steering tube of said frame, and wherein said first tank section comprises a first and a second tank side portions which depart from a tank central portion in which said fuel feeding inlet is arranged, said tank side portions spaced apart in a width direction wherein the lower surface of said first tank section is substantially parallel to the ground.

2. The vehicle of claim 1, wherein:

said tank has a longitudinal extension, which extends between said front part, said central part, and said rear part, considered on a view side of said vehicle, greater than half of a wheelbase of said vehicle, said wheelbase of said vehicle is a distance between rotation axes of said wheels of said vehicle, and said longitudinal extension of said tank is a length thereof measured along a longitudinal direction orthogonal to the rotation axis of said rear wheel, said longitudinal extensions being considered in a condition whereby said vehicle has fully extended suspensions.

3. The vehicle of claim 1, wherein each of said first and second tank side portions extends in an outer position and adjacent to a corresponding front side of a front portion.

4. The vehicle of claim 1, wherein said first and second tank side portions, in a side view, extend at least partially astride said steering tube.

5. The vehicle of claim 1, wherein said tank comprises:

a second tank section, distinct from said first tank section and from said third tank section, the second tank section communicating with said first tank section and extending towards said rear wheel according to an upper profile of said front part of said frame, the second tank section being located above said front part of said frame as seen in a longitudinal side view of the vehicle; and a third tank section communicating with said second tank section and comprised between rear sides of said rear part of said frame.

6. The vehicle of claim 5, wherein:

said tank comprises a lower surface comprising a first surface portion referred to said first tank section, a second surface portion referred to said second tank section, and a third surface portion referred to said third tank section, said first surface portion extends, at least partially, parallel to a support plane of said vehicle, and said second surface portion extends according to an inclined plane in accordance with the upper profile, measured in a longitudinal direction, of said front part of said frame, said third surface portion being partially facing said central part of said frame and partially facing said rear wheel.

7. The vehicle of claim 5, wherein said second tank section of said tank is configured in such a way that its extension in a width direction of the vehicle is less than the distance between said front sides of said front part of said frame.

8. The vehicle of claim 5, wherein:

said tank comprises an upper surface comprising a first surface portion referred to said first tank section and a second surface portion referred to said second tank section, and a saddle of said vehicle rests at least in part on said second surface portion of said upper surface.

9. The vehicle of claim 5, wherein:

the first tank side portion is internally delimited by a first inner surface, at least partially flat, and externally by a first curved surface, and the second tank side portion is internally delimited by a second inner surface, at least partially flat, and externally by a second curved surface, said curved surfaces imparting an outwardly rounded shape to said first and second side tank portions.

10. The vehicle of claim 5, wherein:

said front part of said frame comprises at least one transverse element which extends in the width direction of said vehicle connecting said front sides, and a position of said transverse element identifies, for each of said front sides, a first trellis portion of the frame which extends from said steering tube to said transverse element and a second portion which extends between the corresponding first portion and said central part of said frame.

11. The vehicle of claim 5, wherein said tank is supported through fixing means installed at said rear part of said frame.

12. The vehicle of claim 5, wherein said tank has a decreasing extension, in a width direction of said vehicle from said second tank section to said third tank section according to a plan view of said tank.

13. The vehicle of claim 9, wherein:

said first and second inner surfaces are longitudinally delimited by a transverse inner surface extending in the width direction of said vehicle, and said first and second inner surfaces define a recess of said first tank section having a polygonal shape with respect to a plan view of said tank.

14. The vehicle of claim 13, wherein said transverse inner surface is located in a position spaced from said steering tube whereby said recess defines a space in which a component accessory to the operation of said motor assembly is positioned.

15. The vehicle of claim 13, wherein:

said front part of said frame comprises at least one transverse element which extends in the width direction of said vehicle connecting said front sides, a position of said transverse element identifies, for each of said front sides, a first trellis portion of the frame which extends from said steering tube to said transverse element and a second portion which extends between the corresponding first portion and said central part of said frame, and said recess of said first tank section extends from said steering tube to a position proximal to said transverse element.

16. The vehicle of claim 10, wherein:

said tank is fixed, directly or indirectly, to each of said front sides substantially in a position proximal to said transverse element, said tank resting, for each of said front sides, on a component of said corresponding first trellis portion of the frame.

17. The vehicle of claim 16, wherein said first tank section is connected to each of said front sides through a pair of connecting brackets, each of which extends from a corresponding one of said tank side portions.

18. The vehicle of claim 11, wherein said fixing means comprise a transverse bracket to which said second tank section of said tank is connected, said transverse bracket extending between said rear sides of said frame.

19. The vehicle of claim 15, wherein said tank is fixed to said front portion and/or to said rear portion of said frame such that, for each of said front sides, said second tank section of said tank is positioned above the corresponding second portion.

* * * * *